US010477447B2

(12) United States Patent
Tsai et al.

(10) Patent No.: US 10,477,447 B2
(45) Date of Patent: Nov. 12, 2019

(54) CONNECTION MANAGEMENT METHOD FOR MOBILE DEVICE GROUP

(71) Applicant: INDUSTRIAL TECHNOLOGY RESEARCH INSTITUTE, Hsinchu (TW)

(72) Inventors: Hua-Lung Tsai, Taipei (TW); Hung-Yu Wei, Taipei (TW); Heng-Li Chin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/850,476

(22) Filed: Dec. 21, 2017

(65) Prior Publication Data

US 2018/0227821 A1    Aug. 9, 2018

Related U.S. Application Data

(60) Provisional application No. 62/456,136, filed on Feb. 8, 2017.

(30) Foreign Application Priority Data

Nov. 27, 2017    (TW) .............................. 106141113 A

(51) Int. Cl.
*H04W 36/30* (2009.01)
*H04B 17/309* (2015.01)
(Continued)

(52) U.S. Cl.
CPC .......... *H04W 36/30* (2013.01); *H04B 17/309* (2015.01); *H04W 36/0009* (2018.08);
(Continued)

(58) Field of Classification Search
CPC ..... H04W 24/10; H04W 88/04; H04W 76/23; H04W 36/30; H04W 36/03; H04W 92/18;
(Continued)

(56) References Cited

U.S. PATENT DOCUMENTS 8,306,533 B2    11/2012    Fallon
8,903,419 B2    12/2014    Yu et al.
(Continued)

FOREIGN PATENT DOCUMENTS

CN    101341712 A    1/2009
CN    102065458 A    5/2011
(Continued)

OTHER PUBLICATIONS

Taiwanese Office Action and Search Report for Taiwanese Application No. 106141113, dated Sep. 25, 2018.
(Continued)

*Primary Examiner* — Man U Phan
(74) *Attorney, Agent, or Firm* — Birch, Stewart, Kolasch & Birch, LLP

(57) ABSTRACT

Disclosed is a connection management method for mobile device group, where the mobile device group includes a mobile device configured as a leader and a number of mobile devices configured as followers. The connection management method includes: in response to a measurement control from a first base station, the leader acquires signal quality measurement reports of all the mobile devices in the mobile device group corresponding to the first base station and a second base station, and signal quality measurement reports of all the followers in the mobile device group corresponding to the leader; the first base station determines whether to perform a handover according to the signal quality measurement reports received from the leader; and when the first base station determines to perform the handover, the first
(Continued)

base station determines to perform a joint handover procedure or a half handover procedure according to the signal quality measurement reports.

9 Claims, 15 Drawing Sheets

(51) Int. Cl.
H04W 36/08 (2009.01)
H04W 76/23 (2018.01)
H04W 36/00 (2009.01)
H04B 17/382 (2015.01)
H04W 92/18 (2009.01)
H04W 24/10 (2009.01)
H04W 88/04 (2009.01)

(52) U.S. Cl.
CPC .......... H04W 36/08 (2013.01); H04W 76/23 (2018.02); H04B 17/382 (2015.01); H04W 24/10 (2013.01); H04W 36/0085 (2018.08); H04W 36/03 (2018.08); H04W 88/04 (2013.01); H04W 92/18 (2013.01)

(58) Field of Classification Search
CPC ............. H04W 36/08; H04W 36/0085; H04W 36/0009; H04B 17/309; H04B 17/382
USPC .................................................. 370/252, 331
See application file for complete search history.

(56) References Cited

U.S. PATENT DOCUMENTS

| 9,066,221 | B2 | 6/2015 | Lee | |
| 9,078,121 | B2 | 7/2015 | Georgescu et al. | |
| 9,135,208 | B1 | 9/2015 | Huang et al. | |
| 9,179,382 | B2* | 11/2015 | Madan | H04W 36/18 |
| 9,319,955 | B2* | 4/2016 | Kim | H04W 36/0016 |
| 9,445,316 | B2* | 9/2016 | Lu | H04W 36/0055 |
| 9,629,033 | B2 | 4/2017 | Kulal | |
| 9,706,461 | B2* | 7/2017 | Wu | H04W 36/14 |
| 9,730,134 | B2* | 8/2017 | Yilmaz | H04W 36/30 |
| 9,763,278 | B2* | 9/2017 | Seo | H04W 24/08 |
| 9,848,361 | B2* | 12/2017 | Lu | H04W 36/30 |
| 9,894,591 | B2* | 2/2018 | Chung | H04W 76/14 |
| 9,992,815 | B2* | 6/2018 | Chen | H04W 56/002 |
| 10,004,002 | B2* | 6/2018 | Lindoff | H04W 36/0011 |
| 10,034,322 | B2* | 7/2018 | Ryu | H04W 76/14 |
| 2008/0227474 | A1 | 9/2008 | Dick et al. | |
| 2013/0308598 | A1* | 11/2013 | Madan | H04W 36/18 370/331 |
| 2014/0226629 | A1 | 8/2014 | Kim et al. | |
| 2015/0146687 | A1* | 5/2015 | Kim | H04W 76/14 370/331 |
| 2015/0195865 | A1* | 7/2015 | Lee | H04W 76/14 455/426.1 |
| 2015/0282142 | A1* | 10/2015 | Dahlman | H04W 84/20 370/329 |
| 2016/0021594 | A1* | 1/2016 | Yilmaz | H04W 36/30 370/332 |
| 2016/0100355 | A1* | 4/2016 | Chen | H04W 8/005 370/232 |
| 2016/0142954 | A1 | 5/2016 | Cho et al. | |
| 2016/0157283 | A1 | 6/2016 | Yu et al. | |
| 2016/0165414 | A1 | 6/2016 | Lee et al. | |
| 2016/0205665 | A1 | 7/2016 | Fukuta et al. | |
| 2016/0302119 | A1 | 10/2016 | Chen et al. | |
| 2017/0135001 | A1 | 5/2017 | Kim et al. | |
| 2017/0135020 | A1 | 5/2017 | Kapoulas et al. | |
| 2018/0077746 | A1* | 3/2018 | Lee | H04L 1/18 |
| 2018/0213379 | A1* | 7/2018 | Xiong | H04W 4/70 |

FOREIGN PATENT DOCUMENTS

| CN | 103974431 A | 8/2014 |
| CN | 201721318 A | 6/2017 |
| EP | 3079382 A1 | 10/2016 |
| TW | 201637483 A | 10/2016 |

OTHER PUBLICATIONS

Extended European Search Report, dated Jun. 6, 2018, for European Application No. 17210180.0.
Chen et al., "Handover Mechanism for Device-to-Device Communication," 2015 IEEE Conference on Standards for Communications and Networking (CSCN), Oct. 28-30, 2015, pp. 72-77.
ETSI, "Universal Mobile Telecommunications System (UMTS); LTE; Proximity-based services (ProSe); Stage 2; (3GPP TS 23.303 version 12.2.0 Release 12)," ETSI TS 123 303 V12.2.0, Sep. 2014, pp. 1-62 (63 pages total).
Heinonen et al., "Mobility Management Enhancements for 5G Low Latency Services," 2016 IEEE International Conference on Communications Workshops (ICC), May 23-27, 2016, 6 pages.
Hwang et al., "Group Handover Management for V2x in Moving cell based LTE-Advanced System," 2015 International Conference on Information and Communication Technology Convergence (ICTC), Oct. 28-30, 2015, pp. 1054-1057.
Yilmaz et al., "Smart Mobility Management for D2D Communications in 5G Networks," 2014 IEEE Wireless Communications and Networking Conference Workshops (WCNCW), Apr. 6-9, 2014, pp. 219-223.

* cited by examiner

CONNECTION MANAGEMENT METHOD FOR MOBILE DEVICE GROUP

This application claims the benefit of U.S. provisional application Ser. No. 62/456,136, filed Feb. 8, 2017, and Taiwan application Serial No. 106141113, filed Nov. 27, 2017, the subject matters of which are incorporated herein by references.

BACKGROUND OF THE INVENTION

Field of the Invention

The invention relates to connection management method for mobile device group.

Description of the Related Art

With the development of communication technologies, mobile devices such as mobile phones, notebook computers, and car computers have become ubiquitous in modern life. The device to device (D2D) communication interface allows for the exchange of information between multiple mobile devices. In addition, most of the vehicles nowadays are equipped with a car computer, and information such as traffic and traffic volume can also be exchanged between the vehicles through a vehicle to vehicle (V2V) communication interface. In a broad sense, V2V is also a variation of D2D.

In an environment where D2D communication is so widely used, how to effectively manage the connection of such a group of mobile devices including a plurality of mobile devices is an important issue.

SUMMARY OF THE INVENTION

An embodiment of the present disclosure discloses a connection management method for mobile device group, applied to a mobile device group. The mobile device group includes a plurality of mobile devices. One of the mobile devices is set to a leader mode as a leader. Each of the other mobile devices is set to a follower mode as a follower. The leader and each of the followers connected by device to device (D2D) connection. The connection management method comprising: receiving, by the leader, a measurement control from a first base station; acquiring, by the leader, a first leader signal quality corresponding to the first base station and a second leader signal quality corresponding to a second base station in response to the measurement control; transmitting, by the leader, the measurement control to the followers; for each of the followers of the mobile device group, acquiring, by each of the followers, a first follower signal quality corresponding to the first base station, a second follower signal quality corresponding to the second base station and a sidelink signal quality corresponding to the leader in response to the measurement control; sending, by each of the followers, the first follower signal quality, the second follower signal quality and the sidelink quality to the leader; sending, by the leader, the first leader signal quality, the second leader signal quality, the first follower signal qualities, the second follower signal qualities and the sidelink qualities to the first base station; determining, by the first base station, whether to perform a handover according to the first leader signal quality, the second leader signal quality, the first follower signal qualities, the second follower signal qualities and the sidelink qualities; and determining, by the first base station, whether to perform a joint handover procedure according to the first leader signal quality, the second leader signal quality, the first follower signal qualities, the second follower signal qualities and the sidelink qualities to cause the mobile device group to handover from the first base station to the second base station when the first base station determines to perform the handover.

An embodiment of the present disclosure discloses a connection management method for mobile device group, applied to a mobile device group. The mobile device group includes a plurality of mobile devices. One of the mobile devices is set to a leader mode as a leader. Each of the other mobile devices is set to a follower mode as a follower. The leader and each of the followers connected by device to device (D2D) connection. The connection management method comprising: receiving, by the leader, a measurement control from a first base station; acquiring, by the leader, a first leader signal quality corresponding to the first base station and a second leader signal quality corresponding to a second base station in response to the measurement control; transmitting, by the leader, the measurement control to the followers; for each of the followers of the mobile device group, acquiring, by each of the followers, a first follower signal quality corresponding to the first base station, a second follower signal quality corresponding to the second base station and a sidelink signal quality corresponding to the leader in response to the measurement control; sending, by each of the followers, the first follower signal quality, the second follower signal quality and the sidelink quality to the leader; sending, by the leader, the first leader signal quality, the second leader signal quality, the first follower signal qualities, the second follower signal qualities and the sidelink qualities to the first base station; determining, by the first base station, whether to perform a handover according to the first leader signal quality, the second leader signal quality, the first follower signal qualities, the second follower signal qualities and the sidelink qualities; and determining, by the first base station, whether to perform a half handover procedure according to the first leader signal quality, the second leader signal quality, the first follower signal qualities, the second follower signal qualities and the sidelink qualities to cause the mobile device group to handover from the first base station to the second base station when the first base station determines to perform the handover.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
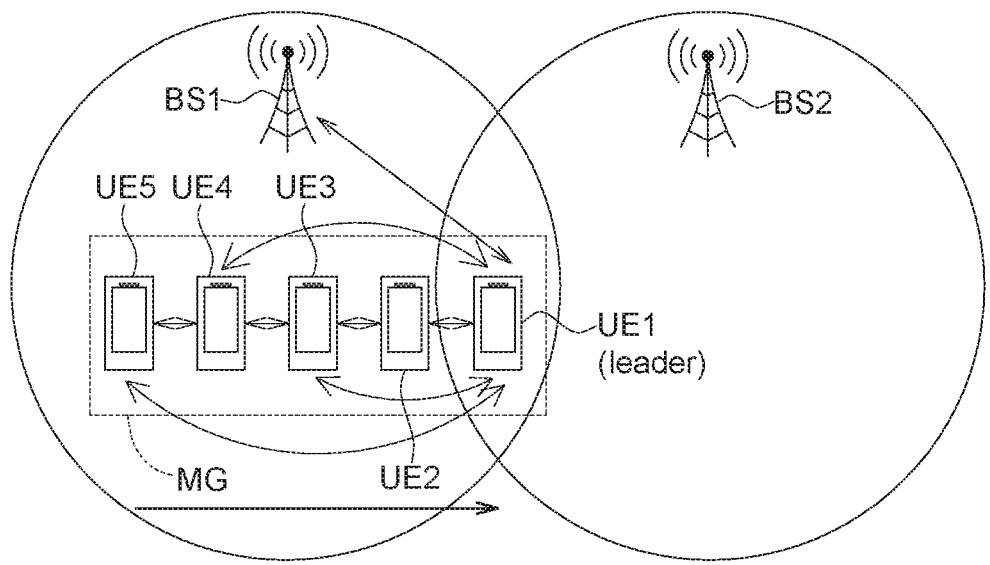
FIG. 1 shows a scheme diagram of communication system architecture according to an embodiment of the present disclosure.

Referring to FIG. 1, FIG. 1 shows a scheme diagram of communication system architecture according to an embodiment of the present disclosure. The communication system 10 includes a first base station BS1, a second base station BS2 and a mobile device group MG.

The first base station BS1 and the second base station BS2 may be, for example, evolved node B (eNB) in Long Term Evolution (LTE) or other infrastructures which can provide communication resource.

The mobile device group MG includes a plurality of mobile devices UE1~UE5, but the quantity of the mobile devices is not limited by. One of the mobile devices in the mobile device group MG is set to a leader mode as a leader, each of the other mobile devices in the mobile device group MG is set to a follower mode as a follower. In this embodiment, the mobile device UE1 is the leader, and the mobile devices UE2~UE5 are the followers. For understanding, the label which is used to illustrate the leader may employ the label of "the mobile device which is set to the leader mode," and the labels which are used to illustrate the follower may employ the label of "the mobile devices which are set to the follower mode." The leader UE1 is connected in communication to the followers via a device to device (D2D) connection such as PC5 link. The leader UE1 may be connected in communication to the first base station BS1 and/or the second base station BS2, and may receive information or instructions from the first base station BS1 and/or the second base station BS2, then may transfer to the followers UE2~UE5. The followers may be connected in communication to or not directly connected in communication to the first base station BS1 and the second base station BS2. In other words, the mobile device group MG communicates with the first base station BS1 and/or the second base station BS2 by using the leader UE1 as delegate, and the followers UE2-UE5 may receive the information or instructions transferred from the leader UE1 to perform corresponding operation.

In this embodiment, the first base station BS1 may hold a D2D information. The contents of the D2D information may include the device numbers of all the mobile devices in the mobile device group MG, the device number of the leader, D2D resource allocation and so on. The leader can identify the followers UE2~UE5. For example, the leader UE1 may hold the device numbers or the other information of the followers UE2~UE5. Each of the followers UE2~UE5 can identify the leader UE1. For example, the followers UE2~UE5 may hold the device number of the leader UE1. The followers may either be able to identify each other or not.

The mobile devices in this embodiment may be portable computer devices such as cell phones, notebook computers, pad, personal digital assistant (PDA), or may be vehicle computer devices or chips such as vehicle computer, on board unit (OBU). In the embodiment that the mobile devices UE1~UE5 are vehicle computer devices or chips, the mobile devices UE1~UE5 may connected in communication via a vehicle to vehicle (V2V) connection. Merely for illustration, D2D connection is taken as an example for illustration. However, V2V connection may also be employed in practice.

Figure 2:
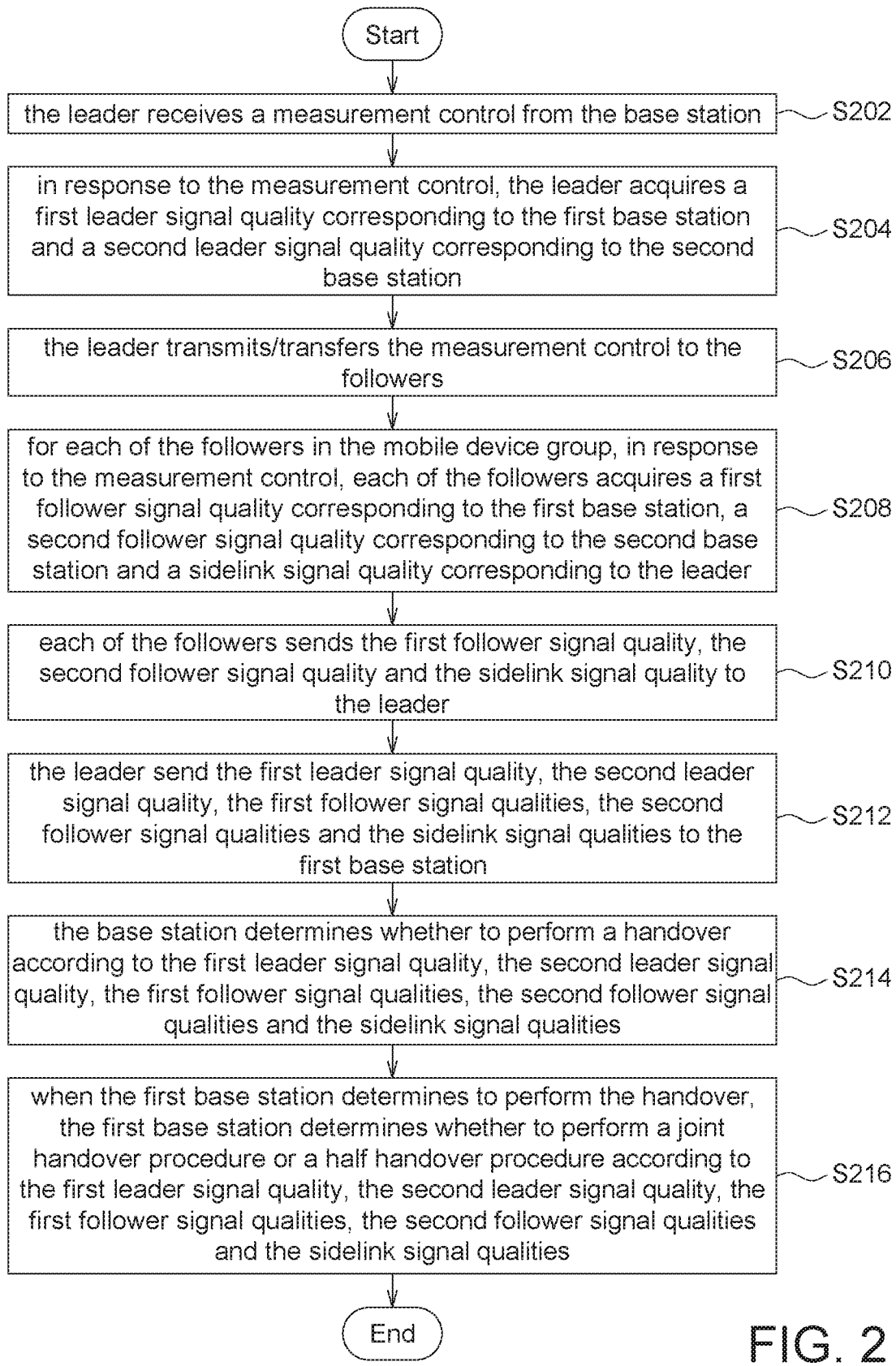
FIG. 2 shows a flowchart of a connection management method for mobile device group according to an embodiment of the present disclosure.
Figure 3:
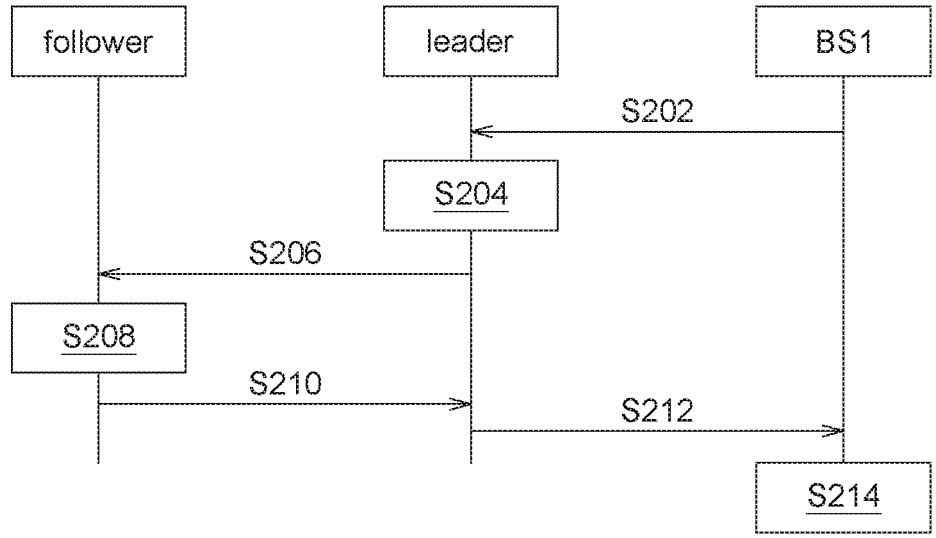
FIG. 3 shows a diagram illustrating signal instructions of a connection management method for mobile device group according to the present disclosure.

Referring to FIG. 2, FIG. 2 shows a flowchart of a connection management method for mobile device group according to an embodiment of the present disclosure. To clearly illustrate, also refers to FIG. 3 which shows a diagram illustrating signal instructions of a connection management method for mobile device group according to the present disclosure.

In step S202, the leader UE1 receives a measurement control from the base station BS1. In this embodiment, the first base station BS1 may periodically sends the measurement control to monitor the status of the mobile device group MG.

In step S204, in response to the measurement control, the leader UE1 acquires a first leader signal quality corresponding to the first base station BS1 and a second leader signal quality corresponding to the second base station BS2. For example, the leader UE1 may acquire the first leader signal quality by measuring the reference signal receiving power (RSRP) or reference signal receiving quality (RSRQ) of reference signals sent from the first base station BS1. Similarly, the leader UE1 may acquire the second leader signal quality by measuring reference signals sent from the second base station BS2. The higher first leader signal quality indicates that the connection status between the leader UE1 and the first base station BS1 is good; on the other hand, the lower the first leader signal quality indicates that the connection status between the leader UE1 and the first base station BS1 is poor. The second leader signal quality is similar.

In step S206, the leader UE1 transmits/transfers the measurement control to the followers UE2~UE5.

In step S208, for each of the followers UE2~UE5 in the mobile device group MG, in response to the measurement control, each of the followers UE2~UE5 acquires a first follower signal quality corresponding to the first base station BS1, a second follower signal quality corresponding to the second base station BS2 and a sidelink signal quality corresponding to the leader UE1. In this embodiment, the followers UE2~UE5 may not be directly connected with the first base station BS1 and/or the second base station BS2. However, in some cases such as that the first base station BS1 and the second base station BS2 sends reference signals by broadcasting, the first follower signal quality and the second follower signal quality may still be acquired, by each of the followers UE2~UE5, by measuring the reference signals from the first base station BS1 and the second base station BS2. The sidelink signal quality may be acquired, by each of the followers UE2~UE5, by measuring reference signal(s) from the leader UE1. "Measuring reference signal(s)" abovementioned refers to measure the parameter(s) such as RSRP or RSRQ of the reference signal(s).

In step S210, each of the followers UE2~UE5 sends the first follower signal quality, the second follower signal quality and the sidelink signal quality to the leader UE1.

In step S212 the leader UE1 send the first leader signal quality, the second leader signal quality, the first follower signal qualities, the second follower signal qualities and the sidelink signal qualities to the first base station BS1. The first leader signal quality and the first follower signal qualities may be regard as a signal quality report corresponding to the first base station BS1 of all the mobile devices UE1~UE5 in the mobile device group MG. The second leader signal quality and the second follower signal qualities may be regard as a signal quality report corresponding to the second base station BS1 of all the mobile devices UE1~UE5 in the mobile device group MG. The sidelink signal qualities may be regard as a signal quality report corresponding to the leader UE1 of all the followers UE2~UE5 in the mobile device group MG.

In step S214, the base station BS1 determines whether to perform a handover according to the first leader signal quality, the second leader signal quality, the first follower signal qualities, the second follower signal qualities and the sidelink signal qualities. "Handover" in this disclosure refers to the transfer of the responsibility to provide communication services. For example, the mobile device group MG "handover" from the first base station BS1 to the second base station BS2 represents that the first base station BS1 provide communication service (e.g., D2D communication resource) to the mobile device group MG before performing the handover, and the second base station BS2 provide communication service to the mobile device group MG after performing the handover.

In step S216, when the first base station BS1 determines to perform the handover, the first base station BS1 determines to perform a joint handover procedure or a half handover procedure according to the first leader signal quality, the second leader signal quality, the first follower signal qualities, the second follower signal qualities and the sidelink signal qualities to cause the mobile device group MG to handover from the first base station BS1 to the second base station BS2.

In this embodiment, when the signal quality between the leader UE1 and the first base station BS1 is poor, and the signal quality between the leader UE1 and the second base station BS2 is good, the base station BS1 may determine to perform the handover. For example, as shown in TABLE 1, when the first leader signal quality is lower than a first threshold, and the second leader signal quality is higher than or equal to a second threshold, the first base station BS1 may determines to perform handover.

TABLE 1

| | The first leader signal quality is higher than or equal to the first threshold. | The first leader signal quality is lower than the first threshold. |
|---|---|---|
| The second leader signal quality is higher than or equal to the second threshold. | not perform the handover | perform the handover |
| The second leader signal quality is lower than the second threshold. | not perform the handover | not perform the handover |

When the first base station BS1 determines to perform the handover, the first base station BS1 may determine whether to perform the joint handover procedure or the half handover procedure according to the conditions shown in TABLE 2.

TABLE 2

| Handover type | Condition | Description |
|---|---|---|
| joint handover | The second follower signal qualities are higher than or equal to a third threshold, and the sidelink signal qualities are higher than or equal to a fourth threshold. | The signal qualities between the followers and the second base station BS2 are good, and the signal qualities between the followers and the leader are also good. |
| half handover (is triggered when either condition 1 or condition 2 is satisfied) | condition 1: The second follower signal qualities are higher than or equal to the third threshold, at least one of the first follower signal qualities is lower than a fifth threshold. condition 2: At least one of the second follower signal qualities is lower than the third threshold, and at least one of the first follower signal qualities is higher than or equal to the fourth threshold. | The signal qualities between the followers and the second base station BS2 are good, and the signal quality between some (one or more) of the followers and the leader is poor. The signal quality between some (one or more) of the followers and the second base station BS2 is poor, and the signal quality between the first base station BS1 and the follower(s) having poor signal quality with the second base station BS2 is good. |

The first threshold, the second threshold, the third threshold, the fourth threshold and the fifth threshold may be either the same or different, and may be configured/set according to the needs.

When performing the joint handover procedure, the first base station BS1 may indicates the leader UE1 to lead the followers UE2~UE5 to collectively handover to the second base station BS2 in mobile device group MG as a unit.

When the half handover procedure is triggered by condition 1 being satisfied, the at least one follower, having the first follower signal quality which is higher than or equal to the fourth threshold and having the at least one sidelink signal quality which is lower than the fifth threshold, enters a half mode and is configured as one or more half mode followers. When the half handover procedure is triggered by condition 2 being satisfied, the at least one follower, having the second follower signal threshold which is lower than the third threshold and having the first follower signal quality which is higher than or equal to the fourth threshold, enters a half mode and is configured as the half mode follower(s).

The half mode follower(s) may periodically measure a half mode follower sidelink signal quality with the leader to confirm the connection status with the leader. The half mode follower(s) may acquire the half mode follower sidelink signal quality by measuring RSRP or RSRQ of the reference signals from the leader. The joint handover procedure and the half handover procedure may be further illustrated below.

Figure 4:
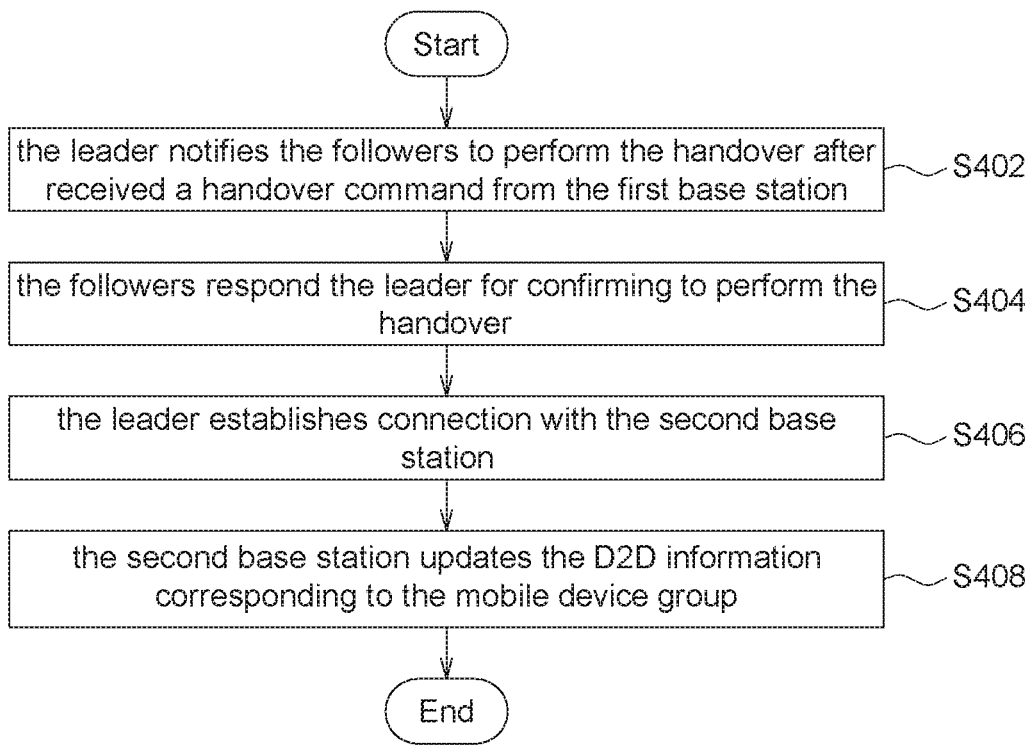
FIG. 4 shows a flowchart of a joint handover procedure according to an embodiment of the present disclosure.
Figure 5:
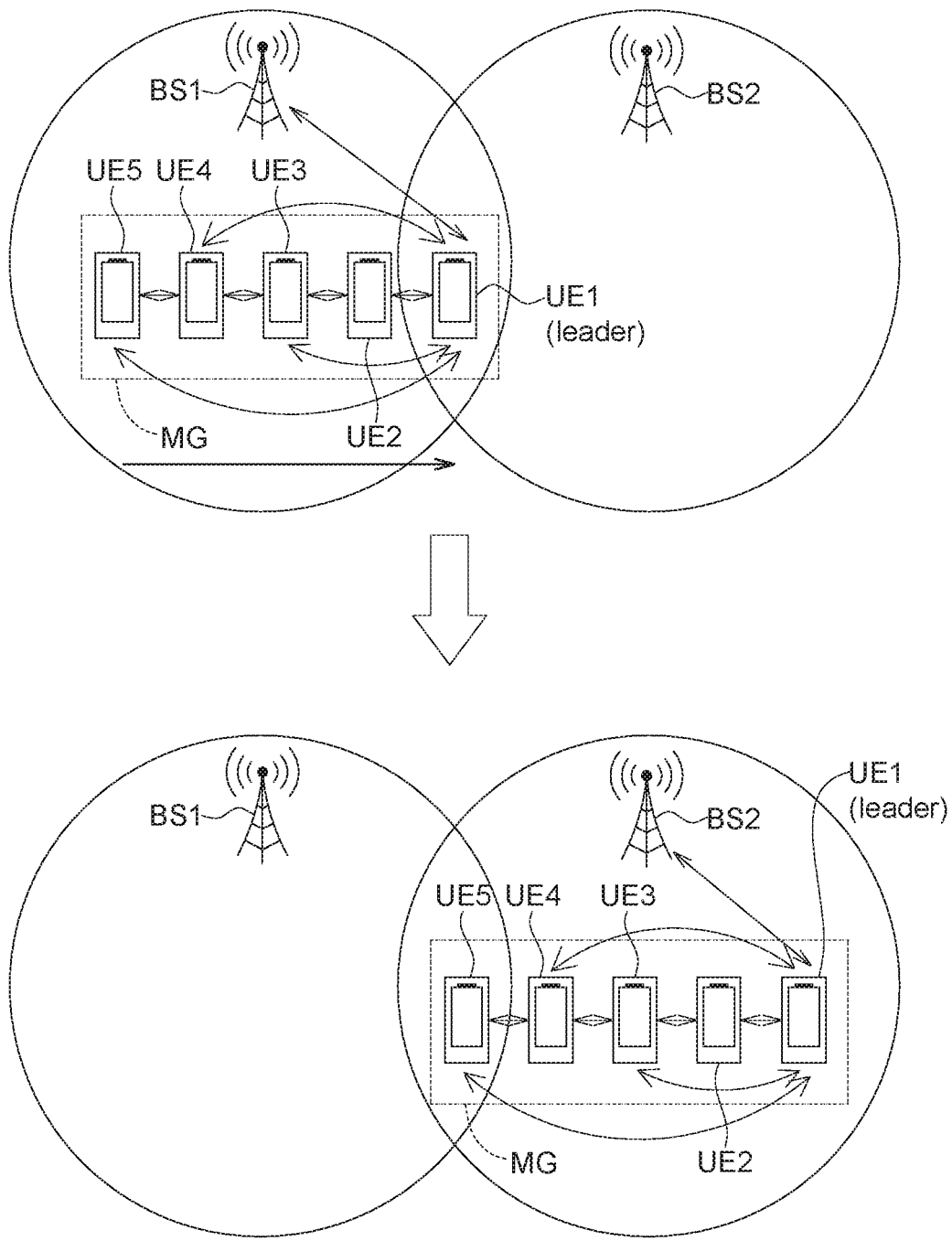
FIG. 5 shows an operation diagram of a joint handover procedure of a communication system according to an embodiment of the present disclosure.

Referring to FIG. 4, FIG. 4 shows a flowchart of a joint handover procedure according to an embodiment of the present disclosure. For understanding, also refers to FIG. 5 which shows an operation diagram of a joint handover procedure of a communication system according to an embodiment of the present disclosure.

In step S402, the leader UE1 notifies the followers UE2~UE5, for example, by a request signal, to perform the handover after received a handover command from the first base station BS1.

In step S404, the followers UE2~UE5 respond the leader UE1, for example, by a confirmation signal, for confirming to perform the handover.

In step S406, the leader UE1 establishes connection with the second base station BS2. After the connection is established, the leader UE1 may obtain a D2D resource allocation from the second base station BS2, and then send the D2D resource allocation to the followers UE2~UE5. The D2D resource allocation may include the information relating to the D2D communication resource, such as frequency band to be used, provided by the second base station BS2.

In step S408, the second base station BS2 updates the D2D information corresponding to the mobile device group MG. The D2D information may include the information such, e.g., the device numbers of the mobile devices in the mobile device group MG, the device number of the leader, the D2D resource used by the mobile device group MG, after handover is done.

Figure 6:
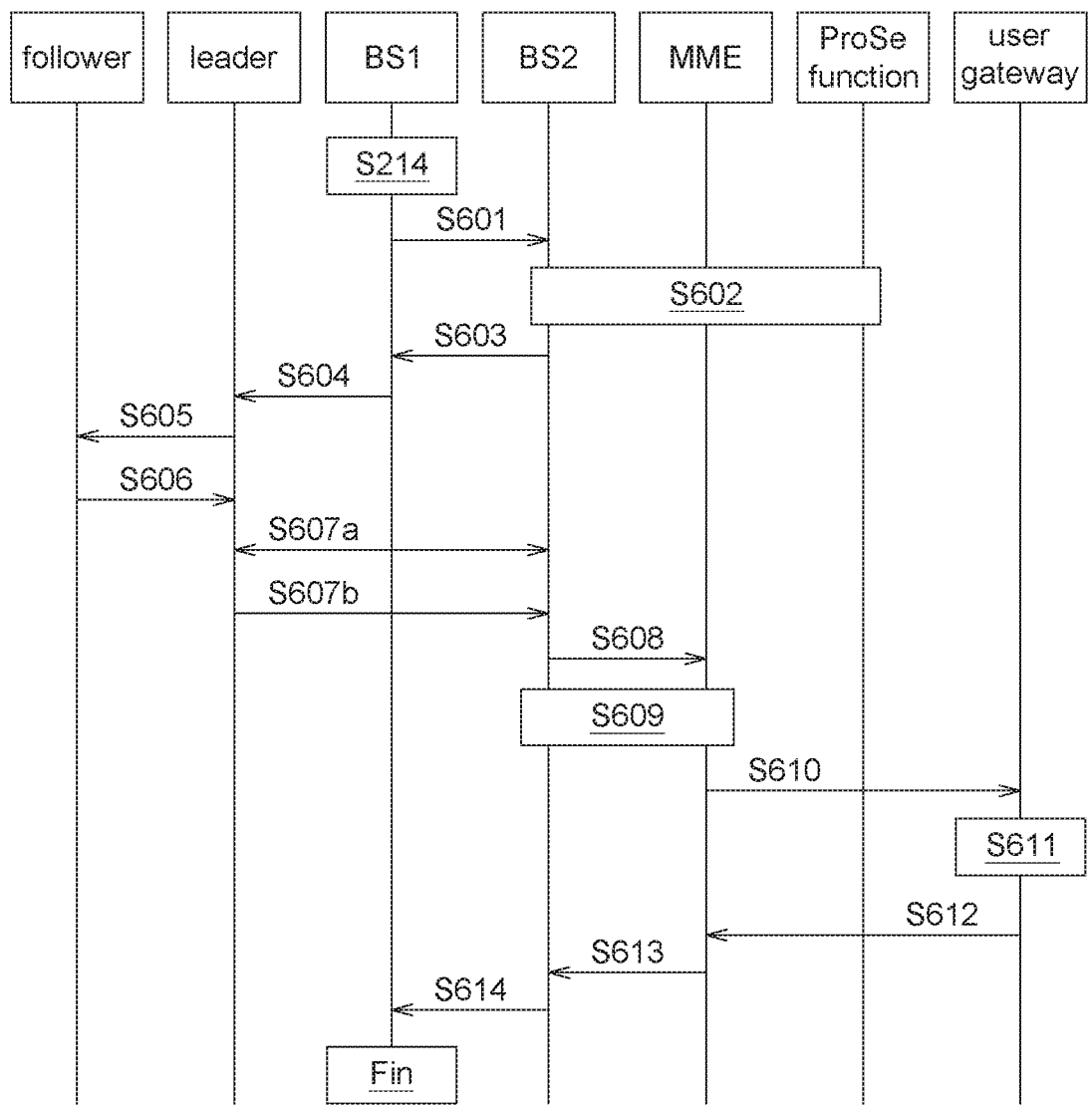
FIG. 6 shows a diagram illustrating signal instructions of a joint handover procedure according to an embodiment of the present disclosure.

Referring to FIG. 6, FIG. 6 shows a diagram illustrating signal instructions of a joint handover procedure according to an embodiment of the present disclosure. This embodiment employs LTE as exemplary system architecture, and is not intended to limit the present application.

When the first base station BS1 determines to perform the joint handover procedure, the first base station BS1 may send a handover request to the second base station BS2 (S601). The handover request may include a handover type (i.e., joint handover in this embodiment), the device numbers of the mobile devices UE1~UE5 in the mobile device group MG, the device number of the leader UE1 and so on. After receives the handover request, the second base station BS2 may perform admission control with mobile management entity (MME) and proximity service (ProSe) function, and prepare D2D communication resource (S602). Then, the second base station BS2 responds to the first base station BS1 for confirming to handover (S603). The first base station BS1 sends a handover command to the leader UE1 (S604). The leader UE1 sends (e.g., by group broadcasting) a D2D direct communication request to the followers UE2~UE5 (S605). The followers UE2~UE5 respond a D2D direct communication request acknowledge to the leader UE1 (S606). The leader UE1 establishes connection with the second base station BS2 which includes connecting contention-free random access channel (RACH) (S607a) and completing radio resource control (RRC) reconfiguration (S607b). The second base station BS2 sends a path switch request to MME (S608). The second base station BS2 and MME update the D2D information (S609). MME and user gateway perform a number of steps for path switching which include modify bearer request (S610), path switch (S611) and modify bearer response (S612). MME notifies the second base station BS2 that path switch is completed (S613). The second base station BS2 notifies the first base station BS1 to release a user context (S614). After the first base station BS1 releases the user context (Fin), the joint handover procedure is finished.

Figure 7:
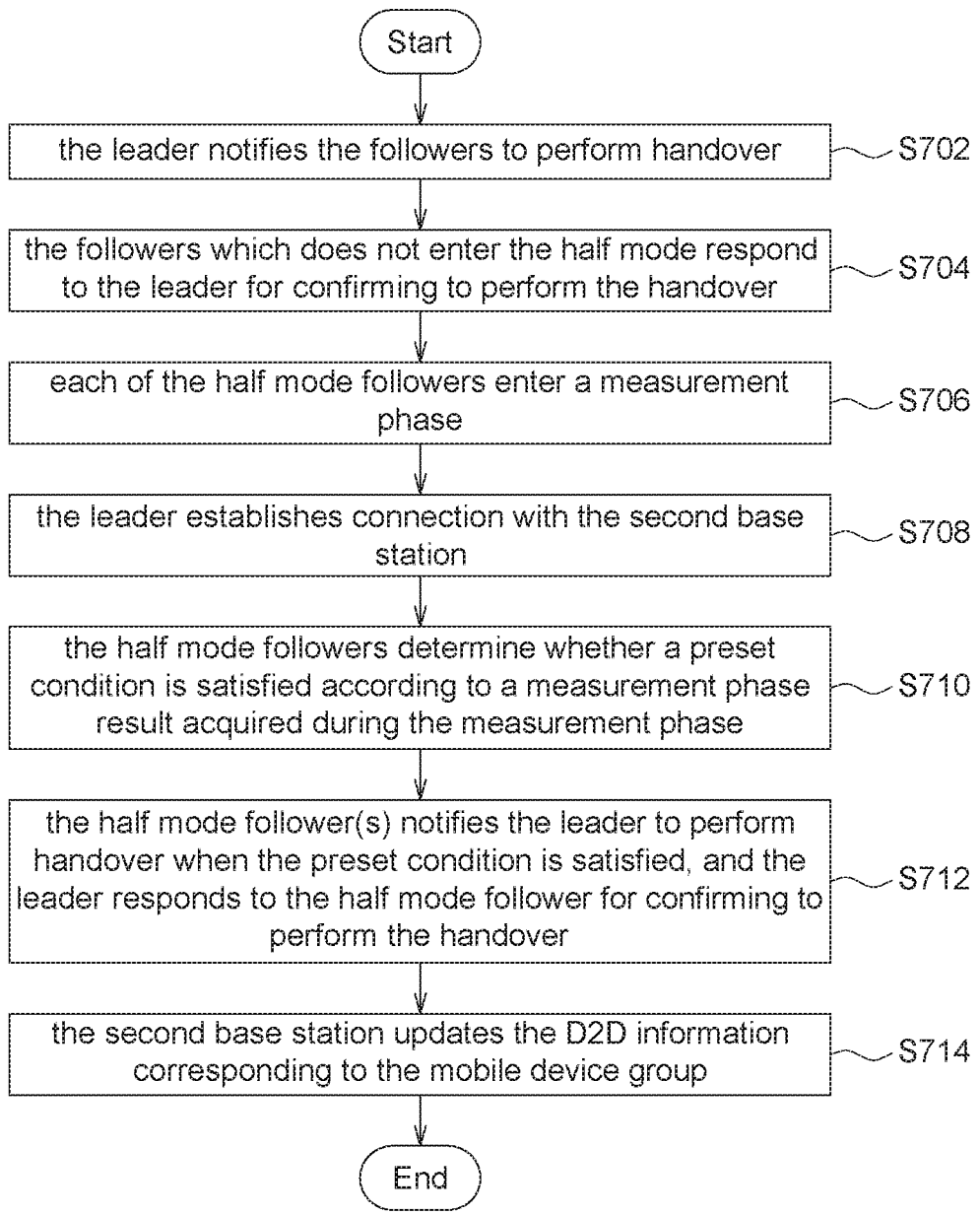
FIG. 7 shows a flowchart of a half handover procedure according to an embodiment of the present disclosure.

Referring to FIG. 7, FIG. 7 shows a flowchart of a half handover procedure according to an embodiment of the present disclosure. For understanding, also refers to FIG. 8 which shows an operation diagram of a half handover procedure of a communication system according to an embodiment of the present disclosure.

Figure 8:
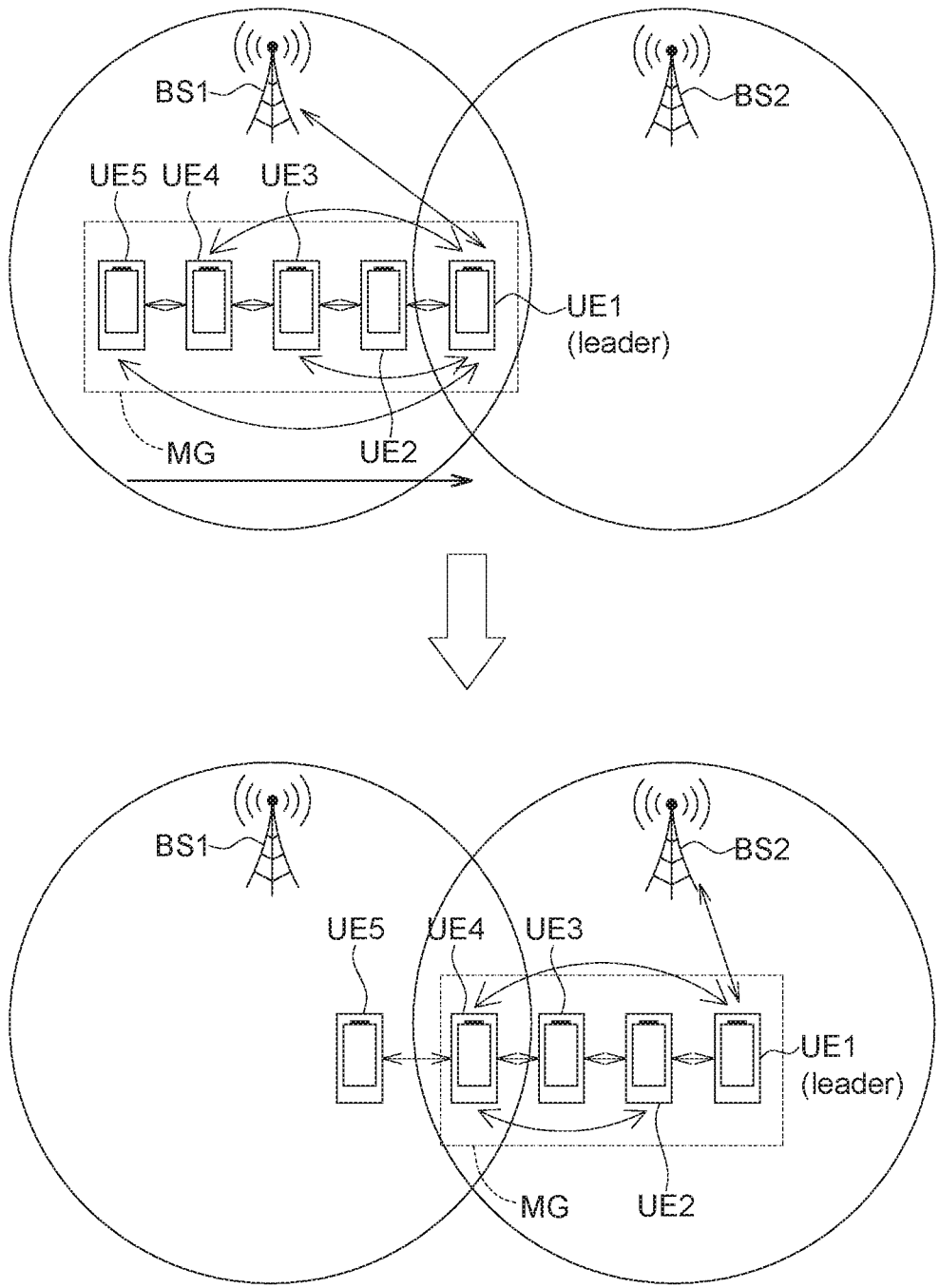
FIG. 8 shows an operation diagram of a half handover procedure of a communication system according to an embodiment of the present disclosure.

In step S702, the leader UE1 notifies the followers UE2~UE5 to perform handover. in this embodiment, as shown in FIG. 8, the followers UE4~UE5 have poor signal quality with leader UE1, for example, due to the far distance between the followers UE4~UE5 and the leader UE1, so that the followers UE4~UE5 enter the half mode (i.e., followers UE4~UE5 are configured as half mode followers).

In step S704, the followers UE2~UE3 which does not enter the half mode respond to the leader UE1 for confirming to perform the handover.

In step S706, each of the half mode followers UE4~UE5 enter a measurement phase. During the measurement phase, the half mode followers UE4~UE5 may periodically measure the reference signal (e.g. measure RSRP or RSRQ of the reference signal) from the leader UE1 to acquire a number of half mode follower sidelink signal qualities. Through the half mode follower sidelink signal qualities, the half mode followers UE4~UE5 may learn whether the signal quality with the leader UE1 has become better.

In step S708, the leader UE1 establishes connection with the second base station BS2. After connection established, the leader UE1 may obtain D2D resource allocation from the second base station BS2, and may transmit/transfer the D2D resource allocation to the followers UE2~UE3 which does not enter the half mode. Additionally, the leader UE1 may reserve the D2D resource allocation to be provided to the half mode followers UE4~UE5.

In step S710, the half mode followers UE4~UE5 determine whether a preset condition is satisfied according to a measurement phase result acquired during the measurement phase. The half mode follower may determine the preset condition is satisfied when the half mode follower sidelink signal quality is higher than or equal to a sixth threshold for more than a preset time. Satisfaction of the preset condition means that the signal quality between the half mode follower and the leader has become better for more than the preset time (i.e., may be considered as good and stable). In this embodiment, assuming that half mode follower UE4 has satisfied the preset condition, but the half mode follower UE5 does not satisfied the preset condition.

In step S712, the half mode follower UE4 notifies the leader UE1 to perform handover when the preset condition is satisfied, and the leader UE1 responds to the half mode follower UE4 for confirming to perform the handover. Additionally, the the leader UE1 may transmit the reserved D2D resource allocation to the half mode follower UE4 which has satisfied the preset condition, and the half mode follower UE4 may be able to leave the half mode.

In step S714, the second base station BS2 updates the D2D information corresponding to the mobile device group MG.

In addition, the half mode follower UE5 which does not satisfy the preset condition may be released from the mobile device group MG by the leader UE1. The leader UE1 may transfer the handover command from the first base station BS1 to the half mode follower UE5 before releases the half mode follower UE5, so that the half mode follower UE5 may be able to obtain a communication resource from the first base station after leaves the mobile device group MG.

Figure 9:
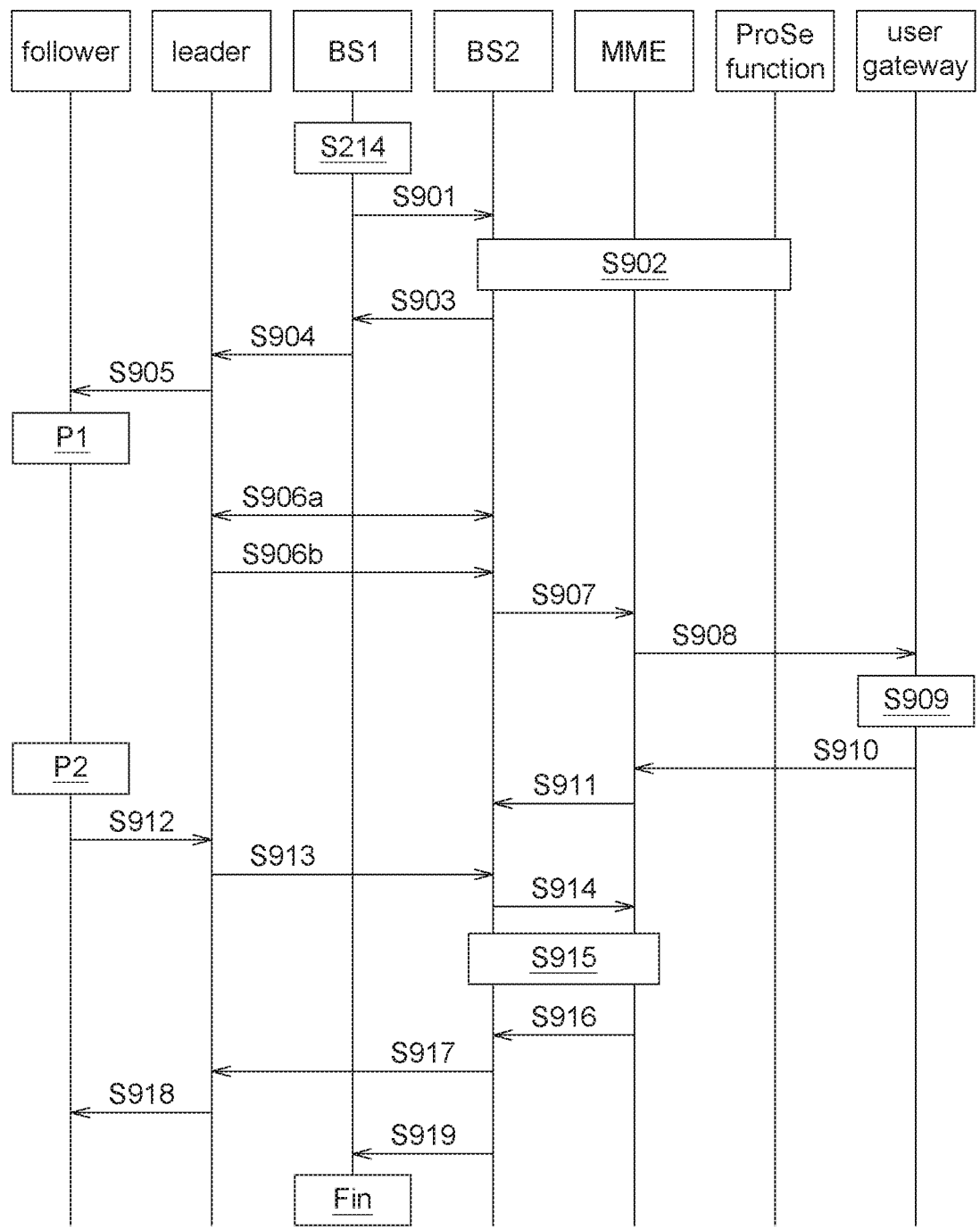
FIG. 9 shows a diagram illustrating signal instructions of a half handover procedure according to an embodiment of the present disclosure.

Referring to FIG. 9, FIG. 9 shows a diagram illustrating signal instructions of a half handover procedure according to an embodiment of the present disclosure. This embodiment employs LTE as exemplary system architecture, and is not intended to limit the present application. To be noted, since the operations of the followers UE2~UE3 which do not enter the half mode are similar to the those when the joint handover procedure is performed, the follower illustration may focus on the followers UE4~UE5 which enter the half mode (i.e., the half mode followers).

When the first base station BS1 determines to perform the half handover procedure, the first base station BS1 may send a handover request to the second base station BS2 (S901). After receives the handover request, the second base station BS2 may perform admission control with MME and ProSe function (S902). Then, the second base station BS2 responds to the first base station BS1 for confirming to handover (S903). The first base station BS1 sends a handover command to the leader UE1 (S904). The leader UE1 sends (e.g., by group broadcasting) a D2D direct communication request to the followers UE2~UE5 (S905). Half mode followers enter the measurement phase (P1). The leader UE1 establishes connection with the second base station BS2 (S906a, S906b). The second base station BS2 sends a path switch request to MME (S907). MME and user gateway perform a number of steps for path switching which include modify bearer request (S908), path switch (S909) and modify bearer response (S910). MME notifies the second base station BS2 that path switch is completed (S911). In this period of time, the half mode followers UE4~UE5 determine whether the preset condition is satisfied (P2). Assuming that the half mode follower UE4 has satisfied the preset condition, but the half mode follower UE5 does not satisfied the preset condition. The half mode follower UE4 which has satisfied the preset condition may send a D2D direct communication request to the leader UE1 (S912). The leader UE1 transfer this D2D direct communication request to the second base station BS2 (S913). Then, after the second base station BS2 send a request for updating the D2D information to the MME (S914), the second base station BS2 and MME prepare the D2D communication resource and update the D2D information (S915). MME responds to the second base station BS2 for acknowledging the request of update D2D information (S916). The second base station BS2 responds to the first base station BS1 for acknowledging the D2D direct communication request (S917). The leader UE1 transmits/transfers the acknowledgement of the D2D direct communication request (S918). The second base station BS2 notifies the first base station BS1 to release a user context (S919). After the first base station BS1 releases the user context (Fin), the half handover procedure is finished.

Figure 10:
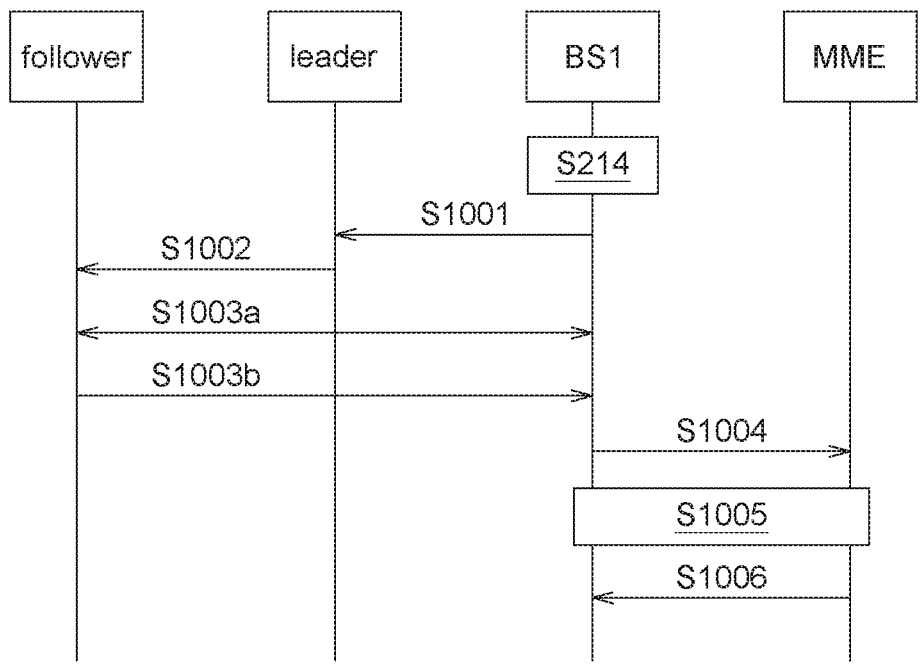
FIG. 10 shows a diagram illustrating signal instructions of connection management for half mode follower which does not satisfy a preset condition in a half handover procedure according to an embodiment of the present disclosure.

Referring to FIG. 10, FIG. 10 shows a diagram illustrating signal instructions of connection management for half mode follower which does not satisfy a preset condition in a half handover procedure according to an embodiment of the present disclosure. This embodiment may be used to handle connection management of the half mode follower which does not satisfy the preset condition in the foregoing embodiment.

The leader UE1 receives a handover command from the first base station BS1 (S1001), and transfer the handover command to the half mode follower UE5 (S1002). Then, the leader UE1 may release the half mode follower UE5 from the mobile device group MG. the half mode follower UE5 may establish connection with the first base station BS1 as an independent mobile device (S1003a, S1003b) to obtain communication resource from the first base station BS1. The first base station BS1 and MME perform a number of steps to update the D2D information, including the first base station BS1 sending update D2D information request to MME (S1004), the first base station BS1 and MME updating the D2D information (S1005) and the MME send acknowledgement of the update D2D information (S1006).

In some cases that the first base station BS1 determines not to perform the handover, the mobile device(s) may leave the mobile device group MG due to poor D2D signal quality or user's decision. In these cases, the mobile device(s) which leave the mobile device group MG may establish connection with a base station having the best signal quality (not limited to the first base station BS1 and the second base station BS2).

In an embodiment, when the signal quality between the leader UE1 and the first base station BS1 is poor (e.g., the first leader signal quality is lower than the first threshold), and the signal quality between the leader UE1 and the second base station BS2 is also poor (e.g., the second leader signal quality is lower than the second threshold), a leader swap procedure may be performed. That is, in such an embodiment, connection management method for mobile device group may further comprise following steps (e.g., between step S214 and S216): determining whether to perform the leader swap procedure according to the first leader signal quality; and when determines to perform the leader swap procedure, performing the leader swap procedure. Through the leader swap procedure, the mobile device which has a better signal quality with the first base station BS1 may be enabled to become the leader, and the original leader may be downgraded to the follower. Details of the leader swap procedure may be illustrated below.

Figure 11:
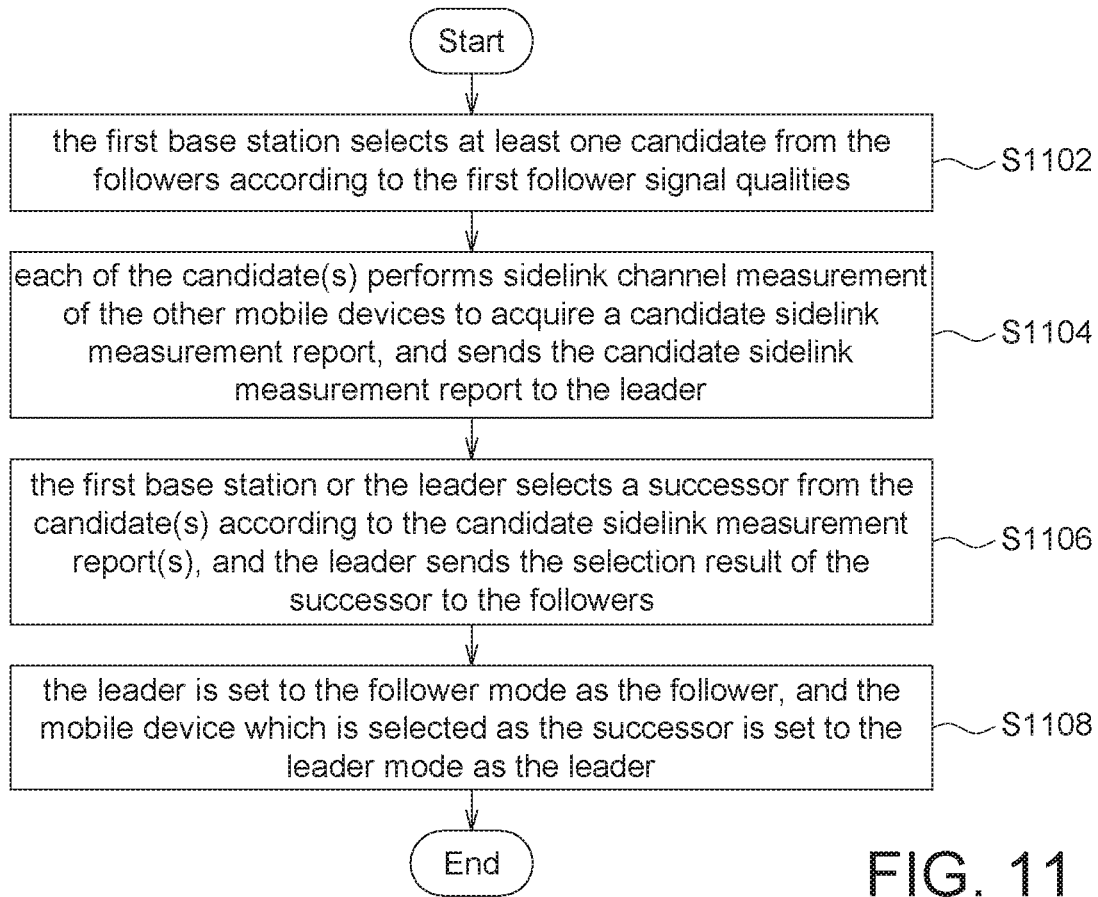
FIG. 11 shows a flowchart of a leader swap procedure according to an embodiment of the present disclosure.

Referring to FIG. 11, FIG. 11 shows a flowchart of a leader swap procedure according to an embodiment of the present disclosure. For understanding, also refers to FIG. 1. The leader swap procedure may be initialed by the first base station BS1 or by a request which is issued by the leader UE1 to the first base station BS1.

In step S1102, the first base station BS1 selects at least one candidate from the followers UE2~UE5 according to the first follower signal qualities. The first base station BS1 may select the follower(s) with a higher first follower signal quality as the candidate(s).

In step S1104, each of the candidate(s) may perform sidelink channel measurement of the other mobile devices to acquire a candidate sidelink measurement report, and may send the candidate sidelink measurement report to the leader UE1. For example, it is assumed that the followers UE2, UE3 are selected as the candidates. The candidate UE2 may send one or more reference signals to the mobile devices UE1, UE3~UE5 to acquire RSRP or RSRQ of the reference signal(s) measured by the mobile device UE1, UE3~UE5 as the candidate sidelink measurement report; the candidate UE3 may send one or more reference signals to the mobile devices UE1~UE2, UE4~UE5 to acquire RSRP or RSRQ of the reference signal(s) measured by the mobile device UE1~UE2, UE4~UE5 as the candidate sidelink measurement report. The candidate sidelink measurement report may represent to the signal quality between the candidate and the other mobile devices.

In step S1106 the first base station BS1 or the leader UE1 selects a successor from the candidate(s) according to the candidate sidelink measurement report(s), and the leader UE1 may send the selection result of the successor (e.g., the device number of the successor) to the followers UE2~UE5. For example, the first base station BS1 or the leader UE1 may select the candidate having a better/the best signal quality with the other mobile devices as the successor. In this embodiment, it is assumed that the successor is mobile device UE3.

In step S1108, the leader UE1 is set to the follower mode as the follower, and the mobile device UE3 which is selected as the successor is set to the leader mode as the leader.

Figure 12:
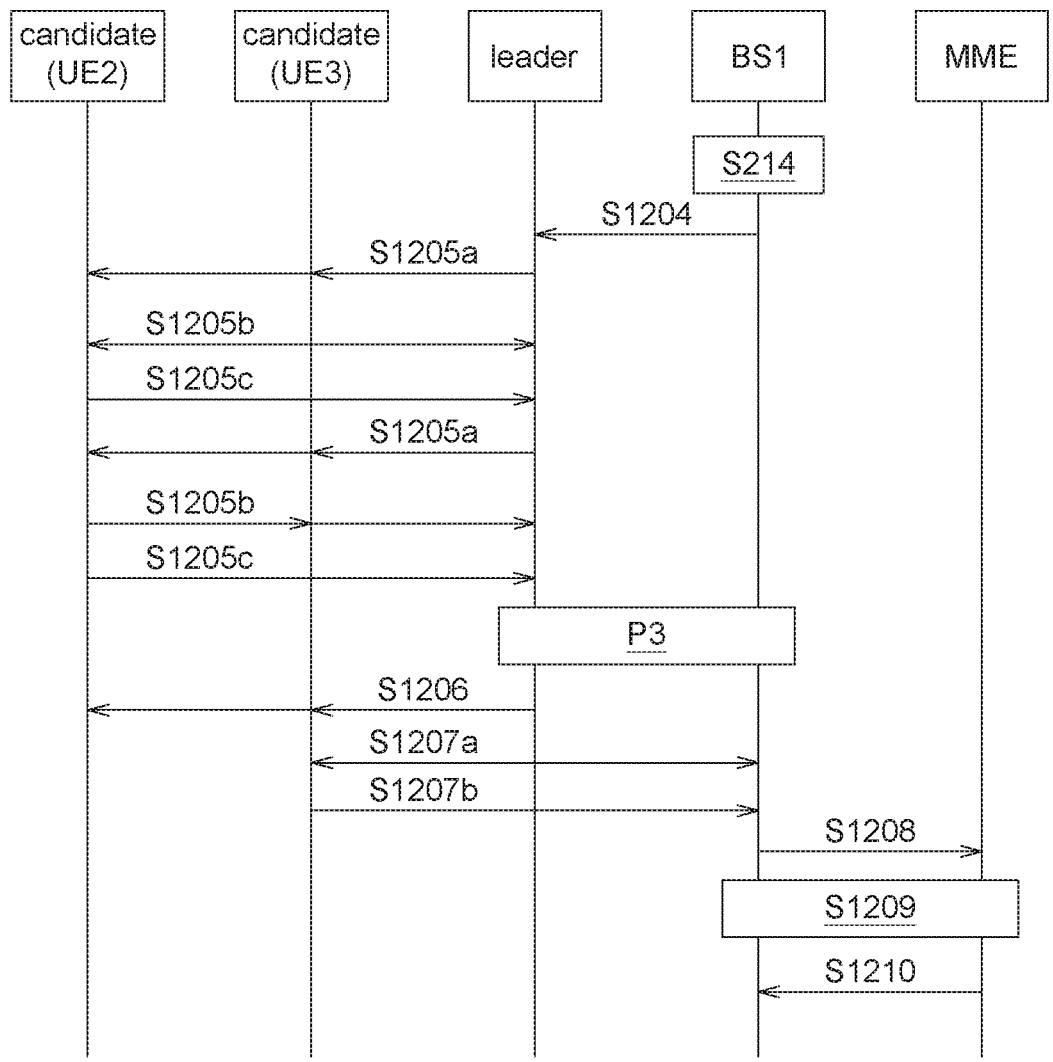
FIG. 12 shows a diagram illustrating signal instructions of leader swap procedure without handover according to an embodiment of the present disclosure.
Figure 13:
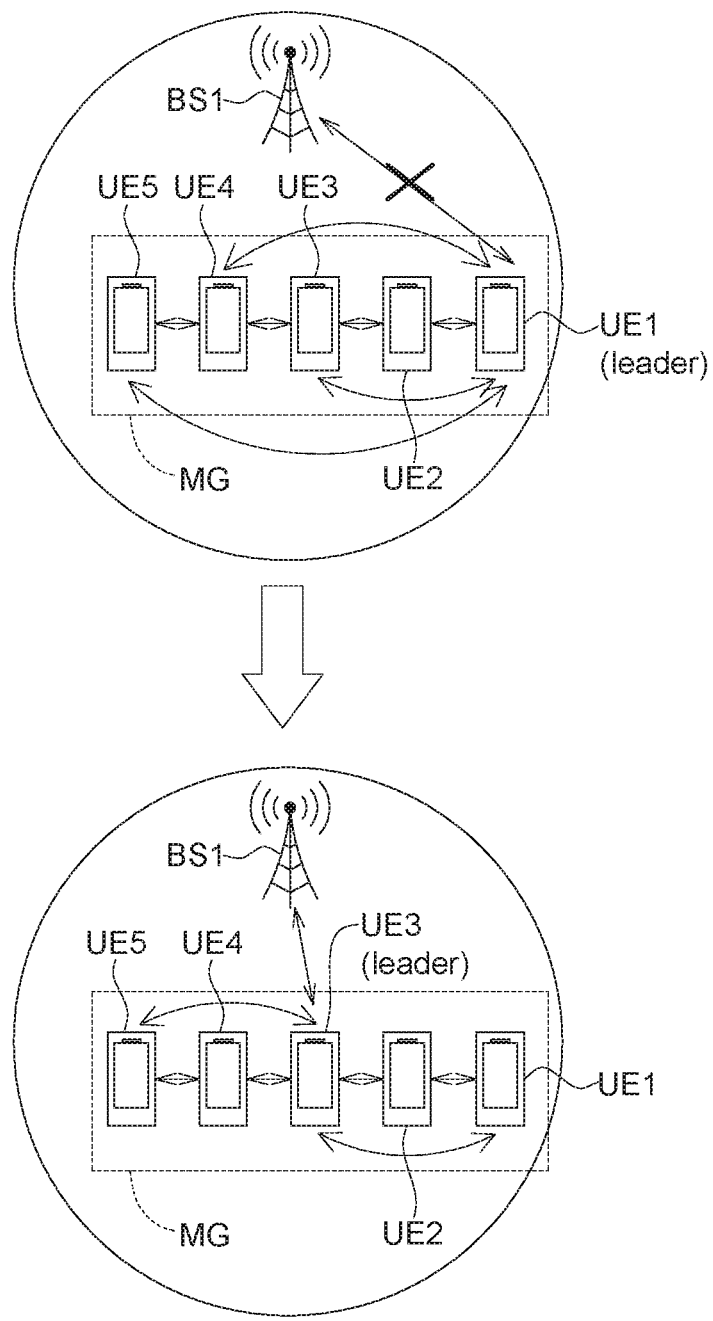
FIG. 13 shows an operation diagram of a communication system according to an embodiment of the present disclosure.

Referring to FIG. 12, FIG. 12 shows a diagram illustrating signal instructions of leader swap procedure without handover according to an embodiment of the present disclosure. For understanding, also refers to FIG. 13 which shows an operation diagram of a communication system according to an embodiment of the present disclosure.

After the first base station makes a handover decision (i.e., not to perform the handover in this embodiment), the first base station BS1 send a handover command to the leader UE1 (S1204). The handover command may include indication of leader swap, the device numbers of the candidate(s) and so on. In this embodiment, the current leader is mobile device UE1, the candidates are mobile devices UE2, UE3. The leader UE1 send a PC5 measurement control to the followers UE2~UE5 (S1205a). The candidates UE2, UE3 send reference signals to the other mobile devices to acquire the candidate sidelink measurement reports (S1205b). The reference signals may send via Physical Sidelink Shared Channel (PSSCH) or Physical Sidelink Control Channel (PSCCH). The candidates UE2, UE3 send the candidate sidelink measurement reports to the leader UE1 (S1205c). The leader UE1 and/or the first base station BS1 selects the successor (P3). The leader UE1 send the device number of the successor to the followers UE2~UE5 (S1206). Then, the (current) leader UE1 may be set to the follower mode, and the successor (i.e., the mobile device UE3, in this embodiment) may be set to the leader mode. The (new) leader UE3 establishes connection with the first base station BS1 (S1207a, S1207b). The first base station BS1 and MME perform a number of steps to update the D2D information, including the first base station BS1 sending a update D2D information request (S1208), the first base station BS1 and MME updating the D2D information (S1209) and MME sending acknowledgement of update D2D information (S1210).

Figure 14:
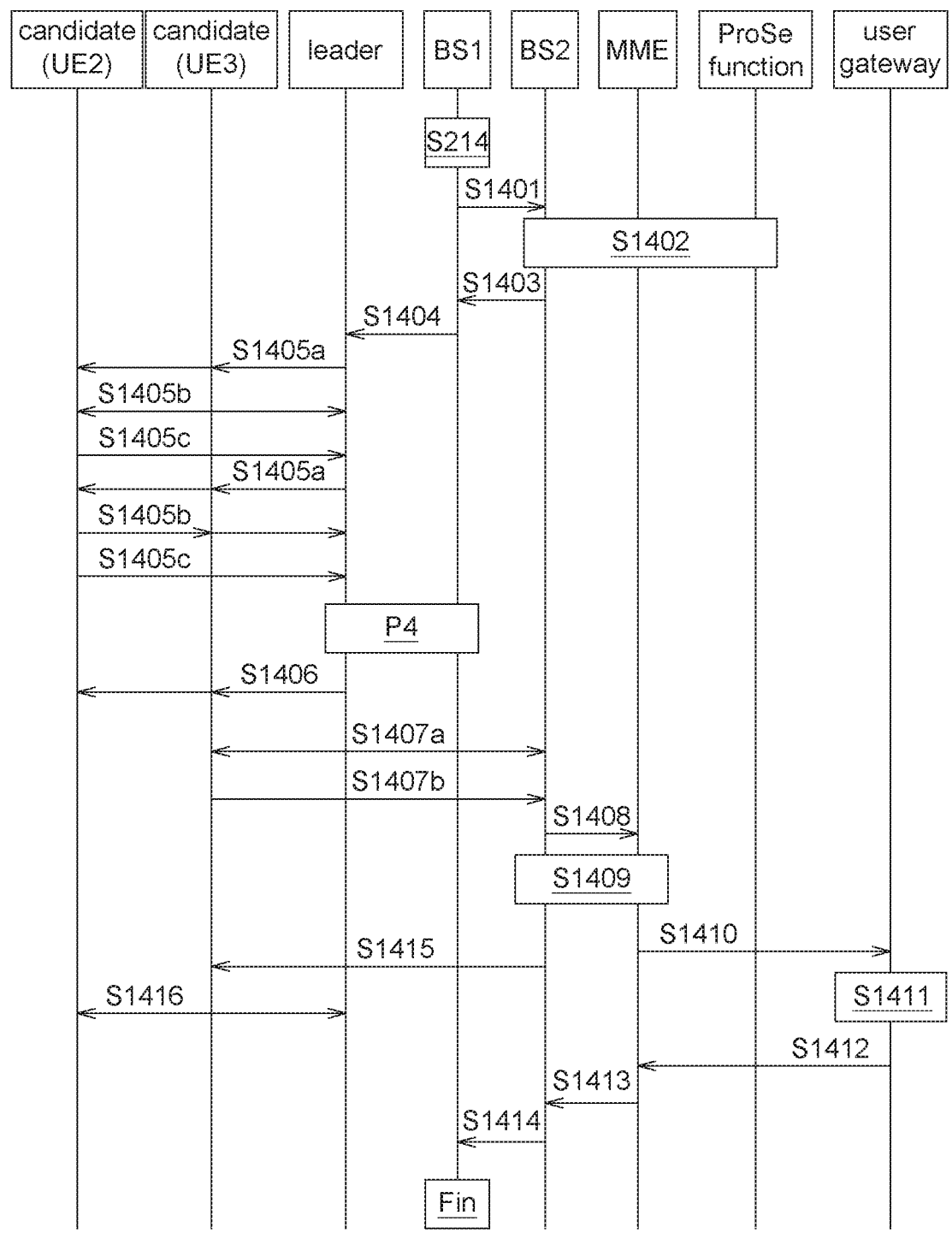
FIG. 14 shows a diagram illustrating signal instructions of a joint handover procedure with leader swap procedure according to an embodiment of the present disclosure.
Figure 15:
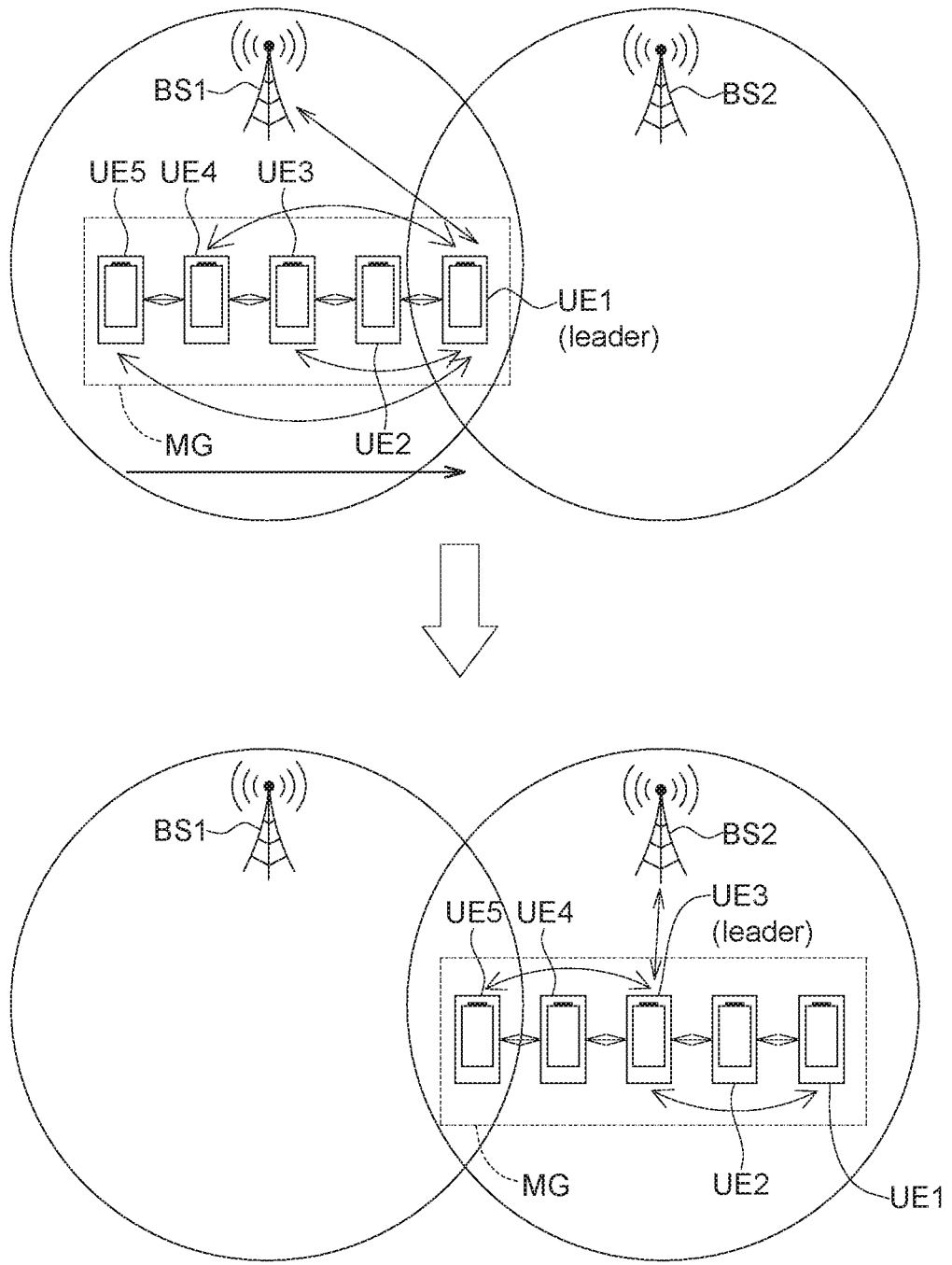
FIG. 15 shows an operation diagram of a communication system according to an embodiment of the present disclosure.

Referring to FIG. 14, FIG. 14 shows a diagram illustrating signal instructions of a joint handover procedure with leader swap procedure according to an embodiment of the present disclosure. For understanding, also refers to FIG. 15 which shows an operation diagram of a communication system according to an embodiment of the present disclosure.

After the first base station BS1 determines to perform the handover, the first base station BS1 may send a handover request to the second base station BS2 (S1401). The second base station BS2, MME and ProSe function may perform admission control (S1402). The second base station BS2 responds to the first base station BS1 for confirming to handover (S1403). The first base station BS1 sends a handover command to the leader UE1 (S1404). Then, the leader UE1 sends (e.g., by group broadcasting) a notification of measurement control (S1405a). The candidates UE2, UE3 perform measurement and send the candidate sidelink measurement reports to the leader UE1 (S1045b, S1405c). The leader UE1 and/or the first base station BS1 selects the successor according to the candidate sidelink measurement reports and decides the handover type (P4). When determining the handover type, the first base station BS1 may regard the various signal quality reports provided by the successor UE3 as those provided by the leader, and may regard the various signal quality reports provided by the current leader UE1 as those provided by a follower. The first base station BS1 may send the handover type (i.e., joint handover, in this embodiment) to the current leader UE1. The current leader UE1 may send the device number of the successor and the handover type to the followers UE2~UE5 (S1405). The successor UE3 may be set to the leader mode as the leader, and the current leader UE1 may be set to the follower mode as the follower. The new leader UE3 establishes connection with the second base station BS2 (S1407a, S1407b). The second base station BS2 sends a path switch request to MME (S1408). The second base station BS2 and MME prepare D2D resource and update the D2D information (S1409). Contents of the D2D information to be updated may include the device number of the new leader UE3, the device number of the mobile devices in the mobile device group MG, D2D resource allocation and so on. The second base station BS2 sends the D2D resource allocation the (new) leader UE3 (S1415), and the leader UE3 send the D2D2 resource allocation the follower UE1~UE2, UE4~UE5 (S1416). On the other hand, MME, ProSe function and user gateway perform a number of steps for path switching which include modify bearer request (S1410), path switch (S1411) and modify bearer response (S1412). MME notifies the second base station BS2 that path switch is completed (S1413). The second base station BS2 notifies the first base station BS1 to release a user context (S1414). After the first base station BS1 releases the user context (Fin), the joint handover procedure is finished.

Figure 16:
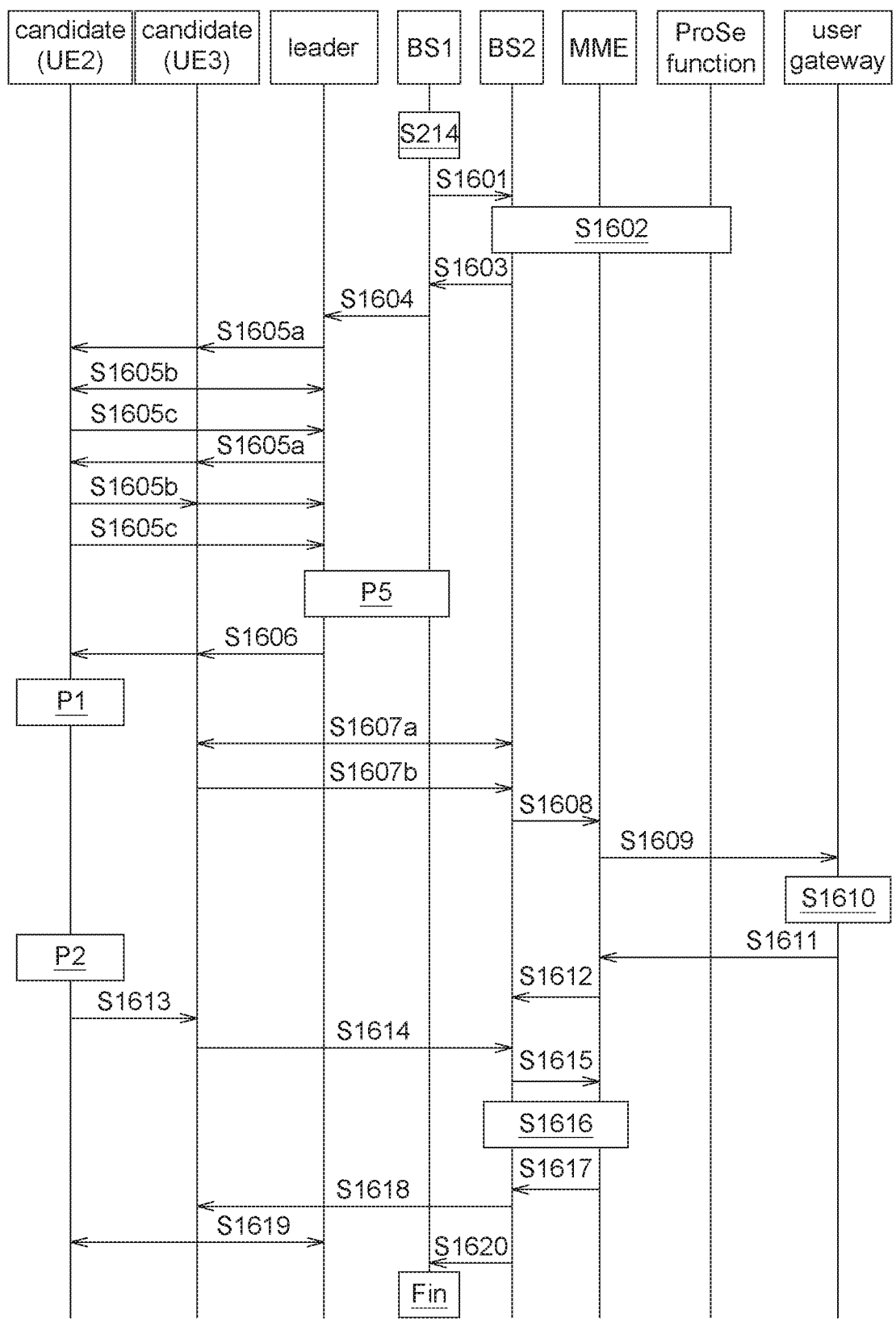
FIG. 16 shows a diagram illustrating signal instructions of a half handover procedure with leader swap procedure according to an embodiment of the present disclosure.
Figure 17:
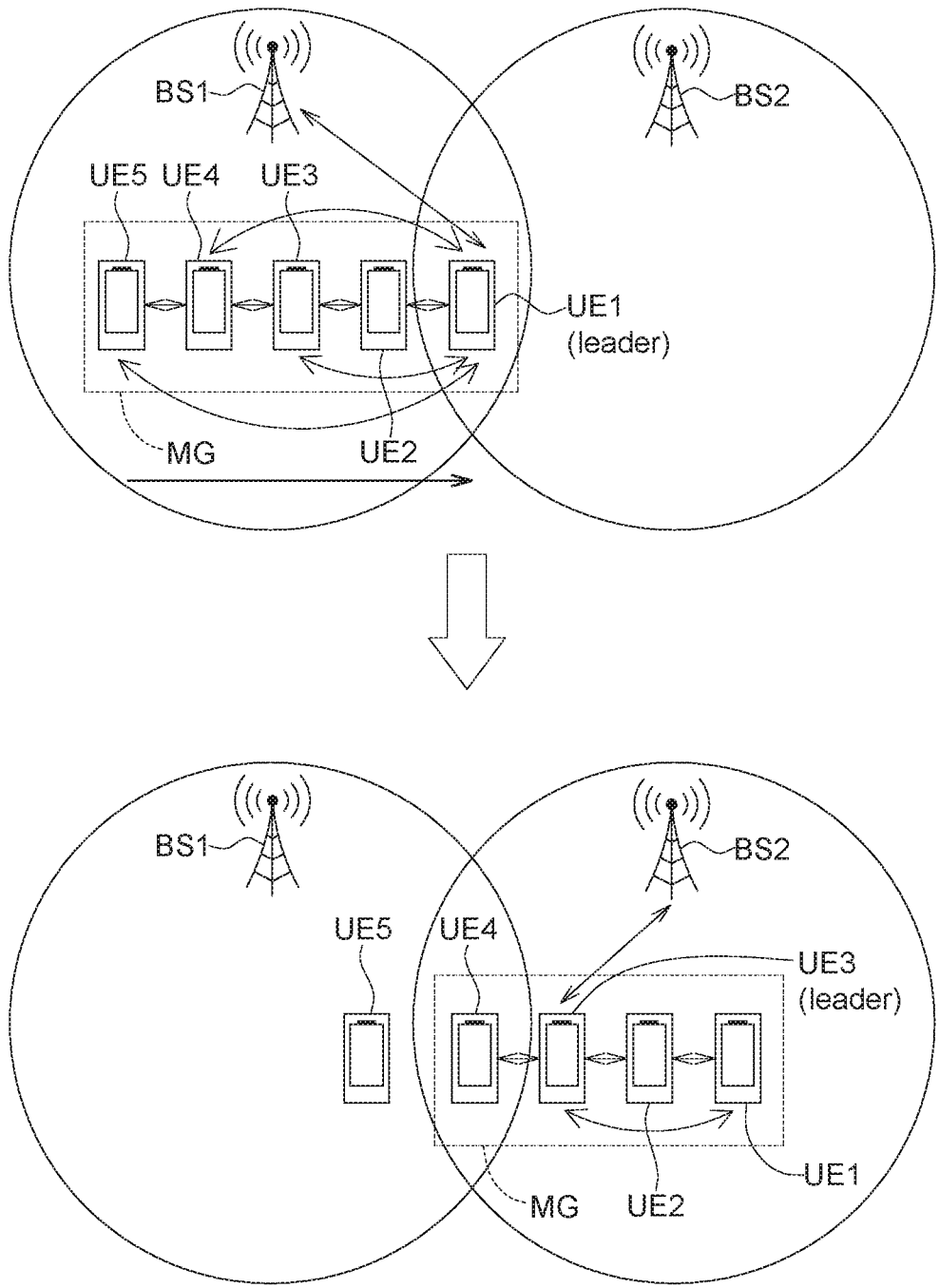
FIG. 17 shows an operation diagram of a communication system according to an embodiment of the present disclosure.

Referring to FIG. 16, FIG. 16 shows a diagram illustrating signal instructions of a half handover procedure with leader swap procedure according to an embodiment of the present disclosure. For understanding, also refers to FIG. 17 which shows an operation diagram of a communication system according to an embodiment of the present disclosure.

The instructions flow in this embodiment is basically similar to those in the foregoing embodiment which does not perform the leader swap procedure. The differences between these two embodiments are that the leader may notify the followers UE2~UE5 to perform sidelink signal quality measurement in the mobile device group MG (S1065a) after the leader UE1 received the handover command from the first base station BS1 (S1604) in order to acquire the candidate sidelink measurement reports (S1605b, S1605c); the first base station BS1 and/or the leader UE1 selects the successor according to the candidate sidelink measurement reports and determines handover type (P5). After the current leader UE1 send the device number of the successor to the followers UE2~UE5, the successor UE3 may be set to the leader mode as the leader, and the current leader UE1 may be set to the follower mode as the follower. Subsequent half handover procedure is similar to those described above, but with the mobile device UE3 being the leader.

"Establish connection" mentioned in the foregoing embodiments may include two steps (e.g., S607a, S607b shown in FIG. 6): establishing contention-free RACH and completing RRC connection configuration. Since they are similar in corresponding steps of the other embodiments shown in the figures, repeated descriptions may not be illustrated.

In some embodiments, the mobile devices set to the follower mode may in a radio resource control inactive (RRC inactive) state. The mobile devices in RRC inactive state may not actively acquire the radio resource, but may still be able to receive the reference signals from the first base station BS1 and/or the second base station BS2, measure the signal qualities and then reserve the result of measurement.

In conclusion, according to various embodiments of the present disclosure, when the joint handover procedure is performed, the leader may lead the followers to handover from the first base station to the second base station; when half handover procedure is performed, the leader may lead the followers which does not leave the mobile device group to handover from the first base station to the second base station. Not only the amount of signal instructions can be saved, but also the communication resources used can be saved, so that the time for handing over a plurality of mobile devices can be shortened. In addition, when the signal quality of the leader is poor, the first base station or the leader may initiate the leader swap procedure. After the leader swap procedure is performed, a follower with good signal quality may become the new leader, so that disconnection due to poor signal quality of the leader may be avoided.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A connection management method for mobile device group, applied to a mobile device group, the mobile device group including a plurality of mobile devices, one of the mobile devices set to a leader mode as a leader, each of the other mobile devices set to a follower mode as a follower, the leader and each of the followers connected by device to device (D2D) connection, the connection management method comprising:
   receiving, by the leader, a measurement control from a first base station;
   acquiring, by the leader, a first leader signal quality corresponding to the first base station and a second leader signal quality corresponding to a second base station in response to the measurement control;
   transmitting, by the leader, the measurement control to the followers;
   for each of the followers of the mobile device group, acquiring, by each of the followers, a first follower signal quality corresponding to the first base station, a second follower signal quality corresponding to the second base station and a sidelink signal quality corresponding to the leader in response to the measurement control;
   sending, by each of the followers, the first follower signal quality, the second follower signal quality and the sidelink signal quality to the leader;
   sending, by the leader, the first leader signal quality, the second leader signal quality, the first follower signal qualities, the second follower signal qualities and the sidelink signal qualities to the first base station;
   determining, by the first base station, whether to perform a handover according to the first leader signal quality, the second leader signal quality, the first follower signal qualities, the second follower signal qualities and the sidelink signal qualities;
   determining, by the first base station, whether to perform a joint handover procedure according to the first leader signal quality, the second leader signal quality, the first follower signal qualities, the second follower signal qualities and the sidelink signal qualities to cause the mobile device group to handover from the first base station to the second base station when the first base station determines to perform the handover;
   determining whether to perform a leader swap procedure according to the first leader signal quality; and
   performing the leader swap procedure when the leader swap procedure is determined to be performed,
   wherein the leader swap procedure comprises:
   selecting at least one of candidate from the followers according to the first follower signal qualities;
   acquiring, by each of the at least one candidate, a candidate sidelink measurement report, and sending the candidate sidelink measurement report to the leader;
   selecting, by the leader or the first base station, a successor from the at least one candidate according to the at least one candidate sidelink measurement report, and sending a result of successor selection to the followers by the leader; and
   setting the leader to the follower mode as the follower, and setting the mobile device which is selected as the successor to the leader mode as the leader.

2. The connection management method according to claim 1, wherein when the first leader signal quality is lower than a first threshold, the second leader signal quality is higher than or equal to a second threshold, the second follower signal qualities are higher than or equal to a third threshold, and the sidelink signal qualities are higher than or equal to a fourth threshold, the joint handover procedure is performed.

3. The connection management method according to claim 1, wherein the joint handover procedure comprises:
   notifying, by the leader, the followers to perform the handover;
   responding, by the followers, to the leader for confirming to perform the handover;
   establishing, by the leader, a connection with the second base station; and
   updating, by the second base station, a D2D information corresponding to the mobile device group.

4. The connection management method according to claim 1, wherein when the joint handover procedure is not performed, the leader swap procedure further comprises:
   updating, by the first base station, a D2D information corresponding to the mobile device group.

5. A connection management method for mobile device group, applied to a mobile device group, the mobile device group including a plurality of mobile devices, one of the mobile devices set to a leader mode as a leader, each of the other mobile devices set to a follower mode as a follower, the leader and each of the followers connected by device to device (D2D) connection, the connection management method comprising:
   receiving, by the leader, a measurement control from a first base station;
   acquiring, by the leader, a first leader signal quality corresponding to the first base station and a second leader signal quality corresponding to a second base station in response to the measurement control;
   transmitting, by the leader, the measurement control to the followers;
   for each of the followers of the mobile device group, acquiring, by each of the followers, a first follower signal quality corresponding to the first base station, a second follower signal quality corresponding to the second base station and a sidelink signal quality corresponding to the leader in response to the measurement control;

sending, by each of the followers, the first follower signal quality, the second follower signal quality and the sidelink signal quality to the leader;

sending, by the leader, the first leader signal quality, the second leader signal quality, the first follower signal qualities, the second follower signal qualities and the sidelink signal qualities to the first base station;

determining, by the first base station, whether to perform a handover according to the first leader signal quality, the second leader signal quality, the first follower signal qualities, the second follower signal qualities and the sidelink signal qualities; and determining, by the first base station, whether to perform a half handover procedure according to the first leader signal quality, the second leader signal quality, the first follower signal qualities, the second follower signal qualities and the sidelink signal qualities to cause the mobile device group to handover from the first base station to the second base station when the first base station determines to perform the handover, wherein:

when the first leader signal quality is lower than a first threshold, the second leader signal quality is higher than or equal to a second threshold, the second follower signal qualities are higher than or equal to a third threshold, at least one of the first follower signal qualities is higher than or equal to a fourth threshold, and at least one of the sidelink signal qualities is lower than a fifth threshold, the half handover procedure is performed, and the at least one follower, having the at least one first follower signal quality which is higher than or equal to the fourth threshold and having the at least one sidelink signal quality which is lower than the fifth threshold, enters a half mode and is configured as at least one half mode follower; or when the first leader signal quality is lower than the first threshold, the second leader signal quality is higher than or equal to the second threshold, at least one of the second follower signal qualities is lower than the third threshold, and at least one of the first follower signal qualities is higher than or equal to the fourth threshold, the half handover procedure is performed, and the at least one follower, having the at least one second follower signal threshold which is lower than the third threshold and having the at least one first follower signal quality which is higher than or equal to the fourth threshold, enters a half mode and is configured as the at least one half mode follower.

6. The connection management method according to claim 5, wherein the half handover procedure comprises:

notifying, by the leader, the followers to perform the handover;

responding, by the followers which does not enter the half mode, to the leader for confirming to perform the handover;

the at least one half mode follower entering a measurement phase;

establishing, by the leader, a connection with the second base station;

determining, by the at least one half mode follower, whether a preset condition is satisfied according to a measurement phase result acquired during the measurement phase;

notifying, by the at least one half mode follower, the leader to perform the handover when the preset condition is satisfied, and the leader responding to the at least one half mode follower which satisfies the preset condition for confirming to perform the handover; and updating, by the second base station, a D2D information corresponding to the mobile device group.

7. The connection management method according to claim 6, further comprising:

when at least one of the at least one half mode follower which does not satisfy the preset condition, the leader releasing the at least one half mode follower which does not satisfy the preset condition from the mobile device group; and the at least one half mode follower which does not satisfy the preset condition acquiring a communication resource from the first base station.

8. A connection management method for mobile device group, applied to a mobile device group, the mobile device group including a plurality of mobile devices, one of the mobile devices set to a leader mode as a leader, each of the other mobile devices set to a follower mode as a follower, the leader and each of the followers connected by device to device (D2D) connection, the connection management method comprising:

receiving, by the leader, a measurement control from a first base station;

acquiring, by the leader, a first leader signal quality corresponding to the first base station and a second leader signal quality corresponding to a second base station in response to the measurement control;

transmitting, by the leader, the measurement control to the followers;

for each of the followers of the mobile device group, acquiring, by each of the followers, a first follower signal quality corresponding to the first base station, a second follower signal quality corresponding to the second base station and a sidelink signal quality corresponding to the leader in response to the measurement control;

sending, by each of the followers, the first follower signal quality, the second follower signal quality and the sidelink signal quality to the leader;

sending, by the leader, the first leader signal quality, the second leader signal quality, the first follower signal qualities, the second follower signal qualities and the sidelink signal qualities to the first base station;

determining, by the first base station, whether to perform a handover according to the first leader signal quality, the second leader signal quality, the first follower signal qualities, the second follower signal qualities and the sidelink signal qualities;

determining, by the first base station, whether to perform a half handover procedure according to the first leader signal quality, the second leader signal quality, the first follower signal qualities, the second follower signal qualities and the sidelink signal qualities to cause the mobile device group to handover from the first base station to the second base station when the first base station determines to perform the handover;

determining whether to perform a leader swap procedure according to the first leader signal quality; and performing the leader swap procedure when the leader swap procedure is determined to be performed, wherein the leader swap procedure comprises:

selecting at least one of candidate from the followers according to the first follower signal qualities;

acquiring, by each of the at least one candidate, a candidate sidelink measurement report, and sending the candidate sidelink measurement report to the leader;

selecting, by the leader or the first base station, a successor from the at least one candidate according to the at least one candidate sidelink measurement report, and sending a result of successor selection to the followers by the leader; and setting the leader to the follower mode as the follower, and setting the mobile device which is selected as the successor to the leader mode as the leader.

9. The connection management method according to claim 8, wherein when the half handover procedure is not performed, the leader swap procedure further comprises:

updating, by the first base station, a D2D information corresponding to the mobile device group.

* * * * *